United States Patent Office

Re. 26,122
Reissued Dec. 6, 1966

26,122

DUCTILE NIOBIUM AND TANTALUM ALLOYS

John W. Semmel, Jr., Wyoming, Ohio, assignor to General Electric Company, a corporation of New York No Drawing. Original No. 3,156,560, dated Nov. 10, 1964, Ser. No. 818,263, June 5, 1959. Application for reissue Sept. 29, 1965, Ser. No. 491,471
7 Claims. (Cl. 75—174)

Matter enclosed in heavy brackets [ ] appears in the original patent but forms no part of this reissue specification; matter printed in italics indicates the additions made by reissue.

This application is a continuation-in-part of my application Serial No. 631,059, filed December 28, 1956, and now abandoned and assigned to the same assignee as the present application.

This invention relates to niobium and tantalum alloys and more particularly to niobium and tantalum alloys which are ductile at both room temperature and elevated temperatures.

The metals niobium and tantalum normally occur together in nature and have similar chemical, physical and mechanical properties. When substantially pure, both metals have high resistance to corrosive attack by nearly all of the mineral acids and have quite high mechanical strength over wide temperature ranges. Thus, the metals are particularly useful for making structural elements subjected to corrosive environments, such as gas turbine parts.

The production of bodies of niobium and tantalum and niobium-tantalum alloys of adequate size to form structural shapes such as sheets, rods, tubes, wires, bars and the like has heretofore been princcipally effected by mechanically pressing substantially pure niobium, tantalum or niobium-tantalum alloy powders into bars, usually two to three feet long and up to about one square inch in cross-section, and sintering the pressed bars in a vacuum. Bars sintered in this fashion usually have a density of about 90 percent of the theoretical density. Higher densities are obtained by rolling or forging the sintered bars and then reheating in vacuum.

Processing limitations normally present in producing coherent bodies from powdered or pulverulent materials limit production to bodies of relatively small cross-sectional areas. Therefore, the size of bodies which may be fabricated by the usual sintering procedures without resorting to brazing or welding operations is similarly limited.

Powder processing of niobium, tantalum and niobium-tantalum alloys has been heretofore required by virtue of the fact that bodies produced by melting and casting techthe like has heretofore been principally effected by menique s have been virtually unworkable at room temperature, unless made from niobium or tantalum which was previously subjected to an extremely high vacuum. High vacuum treatment withdraws nonmetallic impurities, specifically oxygen, nitrogen, and carbon, which are normally present in the metals. These nonmetallics cause an extremely large embrittling effect on the material, which effect previously has been removed only by subjecting the metals to high vacuum treatment. Obviously, both the powder processing and the vacuum treatments result in increased production costs, which lower the usefulness of the niobium, tantalum and niobium-tantalum alloys.

It is therefore a principal object of this invention to provide niobium, tantalum and niobium-tantalum alloys which can be melted and cast under protective atmospheres to produce ingots ductile at both room temperature and at elevated temperatures.

An additional object of this invention is to provide niobium, tantalum and niobium-tantalum alloys in which

TABLE I

| Nb, Percent | Ta, Percent | Ce, Percent | La, Percent | Misch metal, Percent | Y, Percent | As-Cast Hardness, Rockwell A |
|---|---|---|---|---|---|---|
| [1] 100 | ------- | ------- | ------- | ------- | ------- | 72 |
| 99.95 | ------- | 0.05 | ------- | ------- | ------- | 70 |
| 99.9 | ------- | 0.10 | ------- | ------- | ------- | 67 |
| 99.5 | ------- | 0.50 | ------- | ------- | ------- | 69 |
| 99.0 | ------- | 1.00 | ------- | ------- | ------- | 68 |
| 98.0 | ------- | 2.00 | ------- | ------- | ------- | 58 |
| 97.7 | ------- | 2.30 | ------- | ------- | ------- | 60 |
| 95.4 | ------- | 4.60 | ------- | ------- | ------- | 55 |
| 95.0 | ------- | 5.00 | ------- | ------- | ------- | 59 |
| 92.0 | ------- | 8.00 | ------- | ------- | ------- | 43 |
| 95.4 | ------- | ------- | 4.6 | ------- | ------- | 57 |
| 95.4 | ------- | ------- | ------- | 4.6 | ------- | 57 |
| 99.25 | ------- | ------- | ------- | ------- | 0.75 | 69 |
| 98.5 | ------- | ------- | ------- | ------- | 1.5 | 68 |
| 97.0 | ------- | ------- | ------- | ------- | 3.0 | 57 |
| 95.0 | ------- | ------- | ------- | ------- | 5.0 | 59 |
| ------- | [1] 100 | ------- | ------- | ------- | ------- | 68 |
| ------- | 95.4 | ------- | ------- | 4.6 | ------- | 49 |

[1] Nominally pure commercial pulverulent metal.

the nonmetallic embrittling elements present are precipitated as second phases.

Generally, the alloys of the present invention include nobium, tantalum and niobium-tantalum alloys which contain from about 2 to about 10 weight percent of scandium, yttrium, or about 2 to about 10 weight percent of the rare earth elements of the lanthanide series of the Periodic Table to combine with the nonmetallic impurities, notably, oxygen, nitrogen and carbon, and form a second phase dispersion which overcomes the embrittling effects of the nonmetallics.

The lanthanide series of the rare earth elements will be understood to consist of the elements having atomic numbers from 57 to 71, inclusive, and comprise the elements lanthanum, cerium, praseodymium, neodymium, promethium, samarium, europium, gadolinium, terbium, dysprosuim, holmium, erbium, ytterbium, and lutetium. Commercial lanthanum contains about 99.9 weight percent lanthanum, less than 0.1 percent cerium, less than 0.1 percent neodymium, less than 0.1 percent praseodymium, and less than 0.1 percent samarium, usually with trace amounts of others of the rare earth metals. Commercial cerium usually contains about 97 percent cerium, about 0.9 percent neodymium, about 0.5 percent praseodymium, about 0.1 percent samarium, and about 1.5 percent lanthanum, plus others of the rare earth elements. Commercial mischmetal normally contains from about 47 to 52 percent cerium, from about 18 to 19 percent neodymium, from about 5 to 6 percent praseodymium, about 1 percent samarium, and from 24 to 27 percent lanthanum.

According to the present invention, the alloys may be readily prepared by arc melting the various constituents together in an argon or other noble gas atmosphere. For example, alloys having the following nominal compositions were prepared by melting commercially obtainable pulverulent tantalum and niobium with commercial cerium, lanthanum and mischmetal, an alloy or commercial mixture of the lanthanide series elements. According to the supplier's analysis, the powdered tantalum contained 0.05 percent niobium and the powdered niobium contained 0.15 percent tantalum.

The following alloys were melted in a conventional arc melting furnace employing a water-cooled, tungsten-tipped non-consumable electrode and a water-cooled copper crucible.

The Rockwell hardness, scale "A" was determined for each alloy in the as-cast condition and bears a direct relationship to ductility. Upon inspection of the data shown in Table I, it will be seen that increasing additions of cerium produced a decrease in the as-cast hardness of the niobium alloys and the corresponding decrease in hardness in the comparable niobium-lanthanum, niobium-mischmetal, and tantalum-mischmetal alloys. The yttrium additions exhibited effects on the niobium similar to those of the rare earth metals by reducing the hardness as the amount of yttrium added was increased. The results further indicated that while percentage additions of from 2 to 10 weight percent will combine with all the nonmetallics, for alloys containing normal percentages of nonmetallics no more than about 5 weight percent additions need be made. Thus, where fabricating operations such as welding are not contemplated, additions of 2 to 5 weight percent are preferred.

Accompanying the decrease of hardness noted from the results of Table I was an increase in the ductility. In these alloys, the powdered niobium used contained, on analysis, about 0.38 weight percent oxygen, 0.11 percent nitrogen and 0.08 percent carbon. This amount of nonmetallic impurities in either niobium or tantalum or combinations thereof will severely reduce the workability of the material and render it useless for shaping into articles. Currently, the only manner in which melted niobium or tantalum bodies containing these nonmetallic impurities can be rendered ductile is by subjecting them to an extremely high vacuum during a melting process, for example, by subjecting the metals to vacuum during electron beam melting. The principal drawback, however, is the fact that the material thus produced is extremely expensive, on the order of $200 per pound, due to the complex procedure which must be followed during melting and due to a comparatively greater probability of producing a poor ingot.

Referring once again to Table I, the casting made by arc melting the niobium powder without scandium, yttrium or lanthanide series rare earth additions (nominally 100% niobium) was found to be brittle and could not be cold rolled any measurable degree or hot forged without serious cracking. Similar brittleness was exhibited by the 100% tantalum casting. However, the niobium alloy casting containing 2.3 percent cerium was successfully hot forged, and the niobium alloy casting containing 4.6 percent cerium was cold reduced 8 percent in thickness by rolling before serious cracks developed. The niobium alloy casting containing 5 percent cerium was reduced in thickness 67 percent by hot forging and then cold reduced 76 percent in thickness by rolling to form 20 mil thick sheet. The niobium alloy casting containing 8 percent cerium was cold reduced 88 percent in thickness with only minor edge cracking developing. The hot forging disclosed previously was accomplished by heating the castings to 1500° C. in an argon atmosphere and immediately forging in air.

Test specimens were prepared from the 20 mil sheet fabricated from the 5 percent cerium alloy disclosed previously, and tensile test results under various conditions were obtained from these specimens. The results are listed in Table II.

TABLE II

| Condition | Test Temp., °F. | Ult. Tensile Str. (p.s.i.) | 0.2% Yield Str. (p.s.i.) | Percent Elongation (2¼") |
|---|---|---|---|---|
| As rolled | R.T. | 128,000 | 104,000 | 0.8 |
| Annealed [1] | R.T. | 84,000 | 65,000 | 27.0 |
| Annealed [1] | 2,010 | 18,000 | 13,000 | 10.0 |

[1] Recrystallized state—annealed 1 hour at 2800° F. in vacuum.

From the foregoing data, it may be seen that when a sufficient amount of yttrium or rare earth metal is added to the basis metal, the nonmetallics become precipitated as a second phase and the embrittling effect which they exert is removed. While amounts of scandium, yettrium or rare earth metals can be added to just precipitate all of the nonmetallics present, the normal procedure would be to add a slightly larger amount to insure that all the nonmetallics become combined. Also, should it become necessary to weld or otherwise fuse portions of the niobium and tantalum alloys, the excess portion of the rare earth metals will be present to eliminate the possibility of recontamination of the alloy. As an additional factor, it may be noted that the present alloy exhibits a substantial improvement in strength over substantially pure ductile niobium. As a comparison, it has been reported that substantially pure niobium in the cold rolled state has a room temperature ultimate tensile strength of 100,000 p.s.i. and in the annealed (presumably, recrystallized) state, exhibits an ultimate tensile strength of 50,000 p.s.i. These strengths are obviously quite lower than those obtained by using the alloys of this invention, as clearly indicated by the results in Table II.

From the foregoing, it may be seen that the arc melted alloys of my invention have improved ductility over nominally pure arc melted castings of niobium and tantalum and further have improved room temperature strength over the vacuum sintered commercial niobium sheet metal.

What I claim as new and desire to secure by Letters Patent of the United States is:

1. A body composed of (a) at least 90 weight percent of a matrix metal selected from the group consisting of niobium and tantalum, said matrix containing small amounts of oxygen, carbon and nitrogen as nonmetallic impurities and, (b) a compound of a metal selected from the group consisting of scandium, yttrium and the rare earth elements of the lanthanide series of the Periodic Table of Elements, and combinations thereof together with said nonmetallic impurities, said selected metal being added in amounts of from about 2 to 10 weight percent of said alloy to combine with said nonmetallic impurities and increase the ductility of said matrix metal.

2. A body as defined in claim 1 wherein said selected metal is yttrium.

3. A body as defined in claim 1 wherein said selected metal is mischmetal.

4. A body as defined in claim 1 wherein said selected metal is cerium.

5. A body as defined in claim 1 wherein said selected metal is lanthanum.

6. A body as defined in claim 1 wherein said selected metal is added in amounts of from about 2 to 5 weight percent of said alloy.

7. *A body compositionally consisting of (a) at least 90 weight percent of a matrix metal selected from the group consisting of niobium and tantalum, said matrix containing small amounts of oxygen, carbon and nitrogen as nonmetallic impurities, (b) a compound of a metal selected from the group consisting of scandium, yttrium and the rare earth elements of the lanthanide series of the Periodic Table of Elements and combinations thereof, the compound being formed by the combination of the selected metal with the nonmetallic impurities oxygen, carbon and nitrogen present in the original matrix metal, and a metal selected from the group consisting of scandium, yttrium and the rare earth elements of the lanthanide series of the Periodic Table of Elements and combinations thereof dissolved in said matrix metal in an amount larger than that required to precipitate all of the nonmetallic impurities.*

(References on following page)

References Cited by the Examiner

The following references, cited by the Examiner, are of record in the patented file of this patent or the original patent.

UNITED STATES PATENTS

| | | | |
|---|---|---|---|
| 2,187,630 | 1/1940 | Schafer | 75—122 |
| 2,838,395 | 6/1958 | Rhodin | 75—174 |

| | | | |
|---|---|---|---|
| 2,838,396 | 6/1958 | Rhodin | 75—174 |
| 2,881,069 | 4/1959 | Rhodin | 75—174 |
| 2,883,282 | 4/1959 | Wainer | 75—174 |

FOREIGN PATENTS

| | | |
|---|---|---|
| 323,315 | 6/1932 | Canada. |

DAVID L. RECK, *Primary Examiner.*

C. N. LOVELL, *Assistant Examiner.*